(12) United States Patent
King

(10) Patent No.: US 7,976,365 B1
(45) Date of Patent: Jul. 12, 2011

(54) CRUSTACEAN PREPARATION UTENSIL KIT

(76) Inventor: Cinderella N. King, Riverdale, MD (US)

( * ) Notice: Subject to any disclaimer, the term of this patent is extended or adjusted under 35 U.S.C. 154(b) by 0 days.

(21) Appl. No.: 12/879,155

(22) Filed: Sep. 10, 2010

(51) Int. Cl.
*A22C 29/02* (2006.01)
(52) U.S. Cl. .......................................................... 452/6
(58) Field of Classification Search ................ 452/1–13, 452/102–105
See application file for complete search history.

(56) References Cited

U.S. PATENT DOCUMENTS

| | | | | |
|---|---|---|---|---|
| 3,271,814 A | * | 9/1966 | Gorton, Jr. ........................ | 452/3 |
| 3,353,207 A | * | 11/1967 | Weinberger ...................... | 452/3 |
| 4,172,306 A | * | 10/1979 | Hopkins ............................ | 452/6 |
| 5,080,629 A | | 1/1992 | Ellison | |
| 5,613,904 A | | 3/1997 | LaSalle et al. | |
| 6,390,911 B1 | * | 5/2002 | Lombardo ........................ | 452/12 |
| 6,450,871 B1 | * | 9/2002 | Morrison et al. ................. | 452/6 |
| 7,125,329 B2 | * | 10/2006 | Mindes ............................. | 452/3 |
| 7,134,206 B2 | | 11/2006 | Bach | |
| 7,169,032 B1 | * | 1/2007 | Poland ............................. | 452/3 |
| 2007/0026775 A1 | | 2/2007 | Seiple | |

* cited by examiner

*Primary Examiner* — Thomas Price
(74) *Attorney, Agent, or Firm* — Crossley Patent Law; Mark A. Crossley

(57) ABSTRACT

A crustacean preparation utensil kit for cracking the shell of and opening a crustacean body which includes an multi-rod opening device encompassing a shaft with spring-loaded rods on a front end which are released into a crustacean body upon activation of an internal rod release mechanism by pushing a push button as well as a reinforced spring-loaded shell-cracking device having operationally communicating teeth on an inside edge of each of a top portion and a bottom portion and a contoured thumb rest member atop the top portion and a contoured grip member disposed on the bottom portion allowing the user to have a firm grip on the shell-cracking device while pressing the top and bottom portions together.

7 Claims, 4 Drawing Sheets

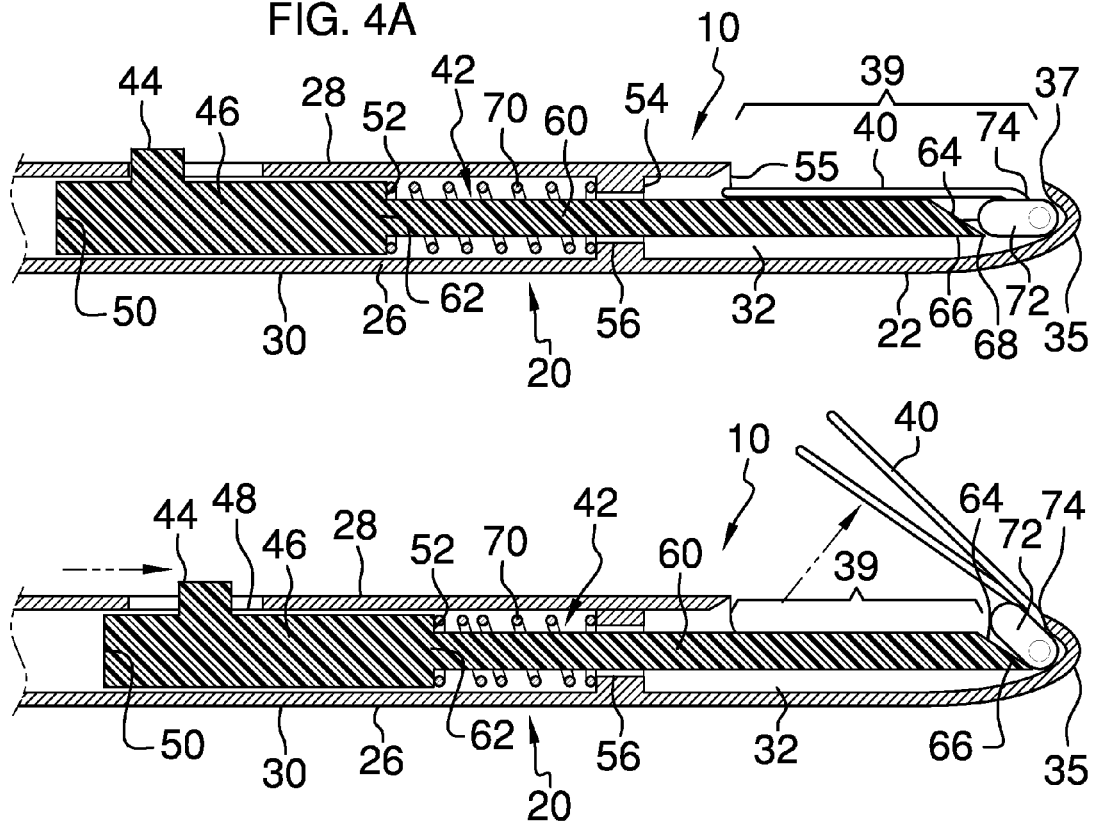
FIG. 4A
FIG. 4B
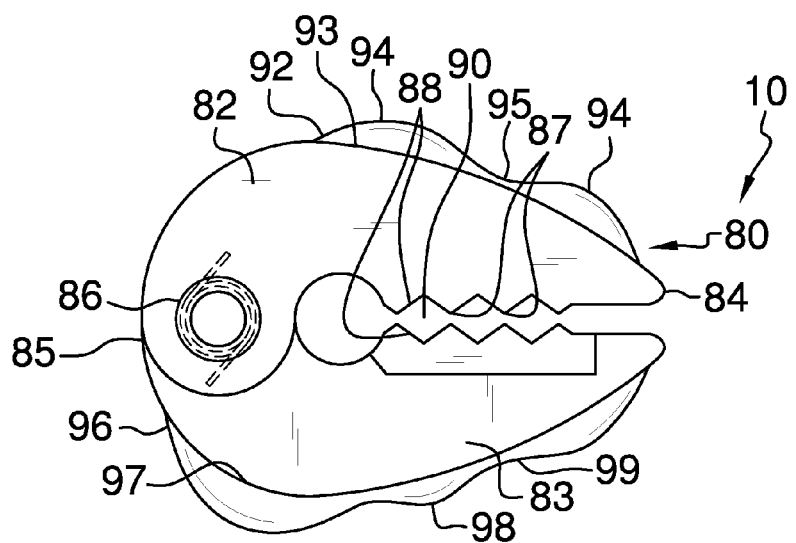
FIG. 5

CRUSTACEAN PREPARATION UTENSIL KIT

BACKGROUND OF THE INVENTION

Crustaceans, including crab and lobster, are typically boiled in water and served in the shell for eating. The shell must be cracked or otherwise removed before the meat of the crustacean can be removed. Subsequent to cracking the shell, the meat must be removed before the meat can be devoured. The process of removing the shell to access the meat is often frustrating. Various types of devices for severing the shells of and removing the meat from shellfish are known in the prior art. However, what is needed is a crustacean preparation utensil kit that includes two devices for cracking the shell of and opening a crustacean body which includes an multi-rod opening device encompassing a shaft with spring-loaded rods on one end that is inserted into the crustacean body and, when activated a rod release mechanism is activated by a push button, cracks open the crustacean body. The kit also includes a cheliform spring-loaded cracking device having operationally interconnected teeth on a top portion and on a bottom portion thereof and also having a contoured thumb rest member atop a top portion thereof and a contoured grip member disposed on a bottom portion thereof permitting the user to have a secure and firm grip on the shell-cracking body.

FIELD OF THE INVENTION

The present invention relates to a utensil for preparing a crustacean for removal of meat, and more particularly, to a crustacean preparation utensil kit for cracking the shell of and opening a crustacean body which includes an multi-rod opening device encompassing a shaft with spring-loaded rods on one end thereof as well as a spring-loaded cracking device.

SUMMARY OF THE INVENTION

The general purpose of the present crustacean preparation utensil kit, described subsequently in greater detail, is to provide a crustacean preparation utensil kit which has many novel features that result in a crustacean preparation utensil kit which is not anticipated, rendered obvious, suggested, or even implied by prior art, either alone or in combination thereof.

To accomplish this, the present crustacean preparation utensil kit provides two devices to crack open a crustacean body, such as a crab or a lobster. The first device includes a shaft having an open section at a front end, a contoured handle at an opposite rear end, and a center section therebetween in which a rod release mechanism resides within an internal cavity therein. A prong with an inwardly pointing tip is disposed at the front end. The device is inserted into the crustacean body with the prong preceding the remaining elements. A plurality of rods is pivotally attached to a pivotal body which is part of the rod release mechanism. A push button activates and alternately deactivates the rod release mechanism, which in turn pivots the pivotal body whereupon the rods are released upwardly and outwardly from the open section thus cracking open the crustacean body. The kit also includes a substantially cheliform shell-cracking body having a reinforced spring that pivotally interconnects a top portion and a bottom portion thereof. A plurality of sharp pointed ridges formed into an inside edge of each of the top portion and the bottom portion are in operational communication with each other. An opening is disposed between the ridges for receiving a crustacean body or portion thereof therein for the purposes of cracking open the crustacean body with the ridges. A contoured thumb rest member disposed on an upper edge of the top portion includes a pair of rounded spaced apart protrusions and an indentation disposed therebetween and a contoured grip member disposed on a lower edge of the bottom portion includes a plurality rounded spaced apart protuberances and a second indentation disposed therebetween, thus allowing a user to have a secure and firm grip on the shell-cracking body while using the shell-cracking body to crack open a crustacean, such as a crab or a lobster. The present device is provided in different sizes to accommodate the cracking of a wide range of sizes of shellfish.

Thus has been broadly outlined the more important features of the present crustacean preparation utensil kit so that the detailed description thereof that follows may be better understood and in order that the present contribution to the art may be better appreciated.

BRIEF DESCRIPTION OF THE DRAWINGS

Figures

FIG. 4A is a cross-section view thereof taken along line 4-4 of FIG. 3.

FIG. 4B is a cross-section view thereof taken along line 4-4 of FIG. 3 with rods in an open position.

FIG. 5 is a side elevation of a cracking device.

DETAILED DESCRIPTION OF THE DRAWINGS

Figure 1:
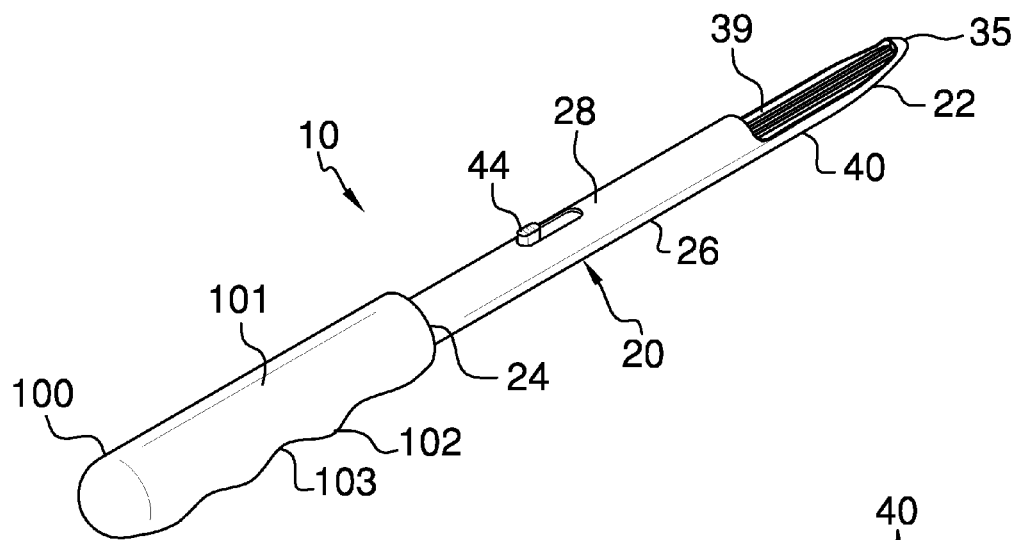
FIG. 1 is an isometric view of an opening device in closed position.
Figure 2:
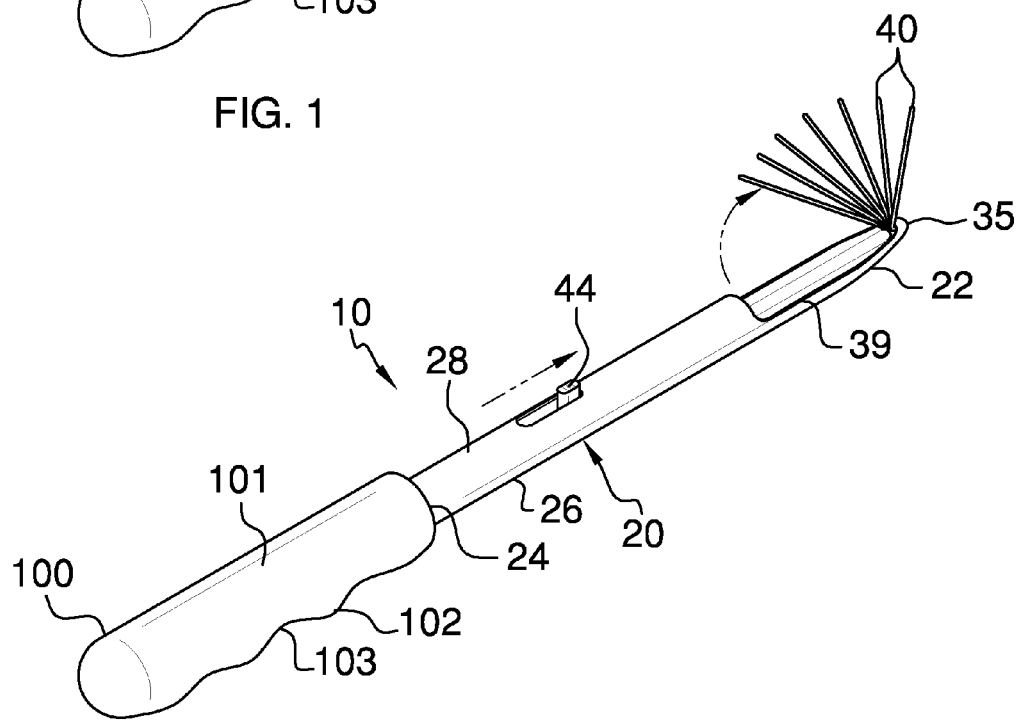
FIG. 2 is an isometric view thereof in open position.
Figure 3:
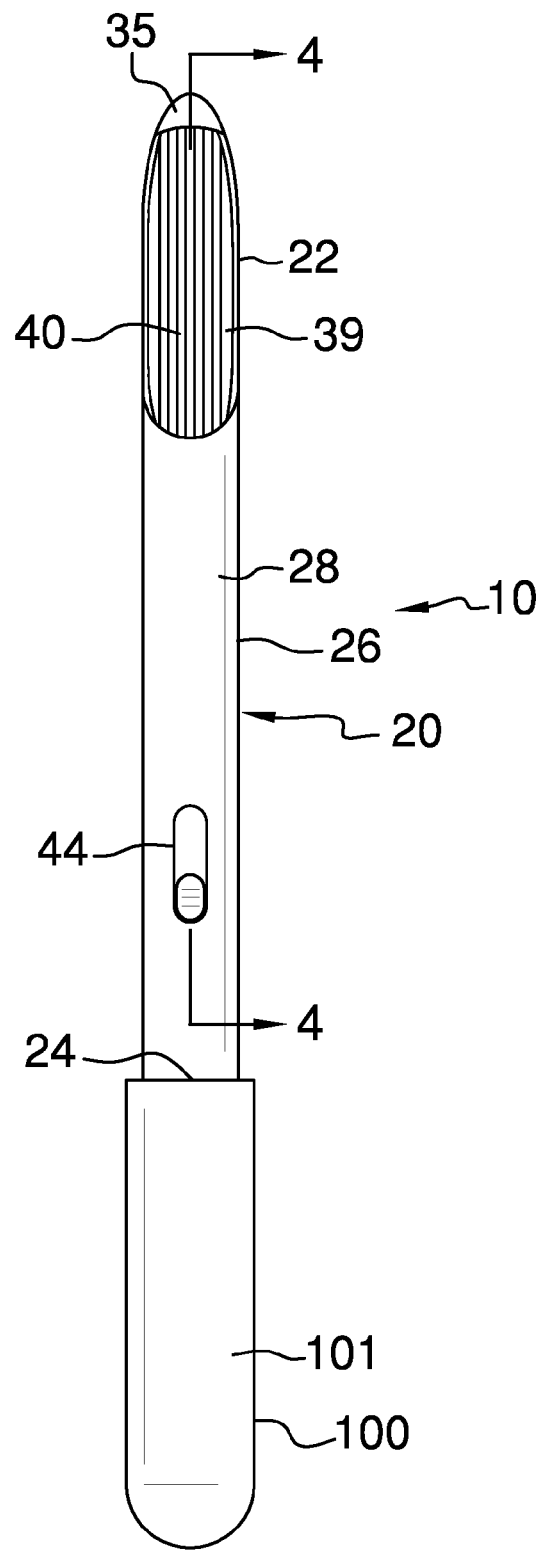
FIG. 3 is a top plan view thereof.
Figure 6:
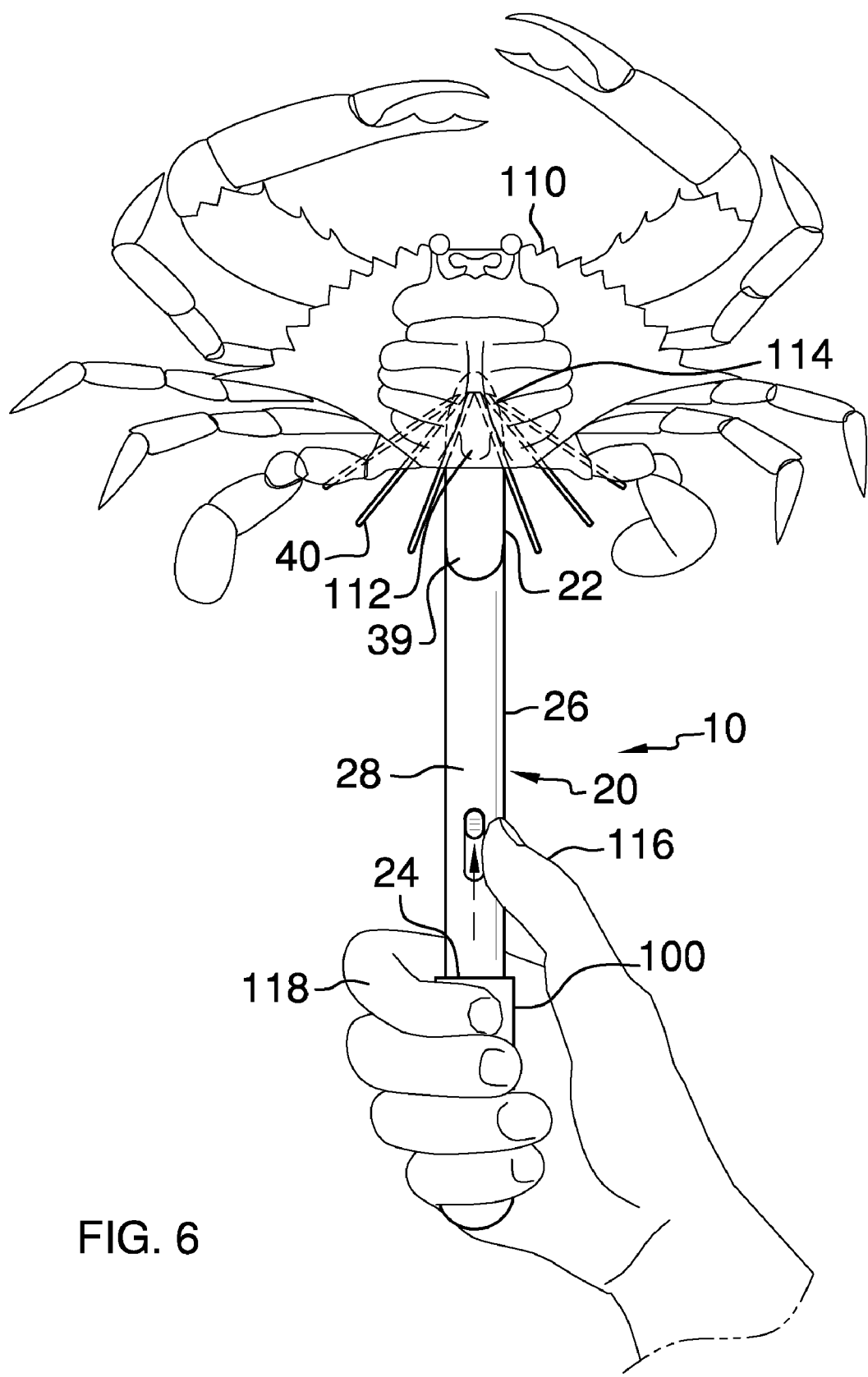
FIG. 6 is an in-use view illustrating use of the opening device to open a crab.

With reference now to the drawings, and in particular FIGS. 1 through 6 thereof, example of the instant crustacean preparation utensil kit employing the principles and concepts of the present crustacean preparation utensil kit and generally designated by the reference number 10 will be described.

Referring to FIGS. 1 through 6 a preferred embodiment of the present crustacean preparation utensil kit 10 is illustrated. The crustacean preparation utensil kit 10 includes an elongated cylindrical shaft 20 having a front end 22, a rear end 24, a center section 26 disposed between the front end 22 and the rear end 24, a top side 28, a bottom side 30, and an internal cavity 32 therein. A prong 35 is disposed on the front end 22. The prong 35 is utilized to removably engage a crustacean body 110 through a rearward end 112 of an abdomen 114 of the crustacean body 110. A sharp tip 37 is disposed on the prong 35. The tip 37 facing upwardly and rearwardly.

An open section 39 is disposed on the top side 38 of the shaft 20 proximal to the front end 22. A plurality of elongated cylindrical rods 40 is disposed along the shaft 20 front end 22 within the internal cavity 32 in a position parallel to the shaft 20. An automatic rod release mechanism 42 is disposed within the internal cavity 32. The release mechanism 42 is in operational communication with the rods 40. A push button 44 disposed on the shaft 20 top side 28 is in operational communication with the rod release mechanism 42.

The rod release mechanism 42 includes a cylindrical release body 46 which is slidingly disposed along the shaft 20 center section 26 within the internal cavity 32. A top end 48 of the release body 46 is attached to the push button proximal to a rear edge 50 of the release body 46. The release body 46 also has a front edge 52. A wall 54 is disposed within the internal cavity 32 proximal to a front side 55 of the shaft 20 center section 26. An aperture 56 is centrally disposed within the wall 54.

The rod release mechanism 42 also includes an elongated cylindrical dowel 60 which has a rearward end 62 fixedly attached to the front edge 52 of the release body 46 within the internal cavity and a forward end 64 having a lower end 66. The forward end 64 is angled rearwardly toward the wall 54 thus allowing space for the rods 40 to be released outwardly from the internal cavity 32 through the open section 39. The dowel 60 has a smaller diameter than the release body 46. A cylindrical stem 68 extends forwardly from the lower end 66 of the dowel 60 forward end 64. The stem 68 has a smaller diameter than the dowel 60. A spring 70 surrounds the dowel 60. The spring 70 is disposed between the release body 46 front edge 52 and the wall 54. A pivotal member 72 is disposed within the internal cavity 32. The pivotal member 72 is pivotally attached to the stem 68. An interior end 74 of each rod 40 is pivotally attached to the pivotal member 72.

Activation and alternate deactivation of the push button 44 engages and alternately disengages the release body 46, respectively. The release body 46 slidingly engages and alternately disengages the spring 70 which, in turn, slidingly engages and alternately disengages the dowel 60 upon activation and alternate deactivation of the push button 44, respectively. The stem 68 pivots the pivotal member 72 upwardly from the open section 39 upon engagement of the release body 46. The pivotal member 72 releases the rods 40 upwardly and outwardly from the internal cavity 32 and through the open section 39 upon the pivoting of the pivotal member 72. The rods 40 move downwardly and inwardly into the internal cavity 32 upon the release of the push button 44.

A cylindrical handle 100 having a continuous outer wall 101 is attached to the shaft 20 rear end 24. A plurality of contoured ridges 102 is disposed along a lower side 104 of the outer wall 101. A groove 103 is disposed between the ridges 102. Each groove 103 is formed to accommodate a finger therein thus preventing slippage of the present device 10 out of a user's hand.

The present crustacean preparation utensil kit 10 also includes a substantially cheliform shell-cracking body 80. The shell-cracking body 80 has a top portion 82, a bottom portion 83, a forward portion 84, and a rear side 85. The top portion 82 and the bottom portion 83 have an identical length. A reinforced spring 86 pivotally interconnects the top portion 82 and the bottom portion 83 proximal to the shell-cracking body 80 rear side 85. The reinforced spring 86 further operationally interconnecting the top portion 82 and the bottom portion 83. A plurality of sharp pointed ridges 87 is formed into an inside edge 88 of each of the top portion 82 and the bottom portion 83 proximal to the forward portion 84. The ridges 87 are disposed on the top portion 82 in operational communication with the ridges 87 disposed on the bottom portion 83.

An opening 90 is disposed between the ridges 87. The opening 90 removably receives a crustacean body 110 or portion thereof therein. A contoured thumb rest member 92 is disposed on an upper edge 93 of the top portion 82. The thumb rest member 92 is formed of a pair of rounded spaced apart protrusions 94 and an indentation 95 disposed therebetween. The indentation 95 between the protrusions 94 is formed to accommodate a user's thumb 116 therein. A contoured grip member 96 is disposed on a lower edge 97 of the bottom portion 83. The grip member 96 includes a plurality of rounded spaced apart protuberances 98 and a second indentation 99 disposed therebetween. Each second indentation 99 between the protuberances 98 is formed to accommodate a user's finger 118 therein.

USE:

To initiate use of the present crustacean preparation utensil kit 10 to crack open a crustacean body 110, such as a crab or lobster, a user begins by placing one of the user's fingers 118 into the each groove 103 disposed between the contoured ridges 102 disposed in the handle 100 outer wall 101. Use continues by inserting the prong 35 disposed on the front end 22 of the shaft 20 into a rearward end 112 of an abdomen 114 of a crustacean body 110. The user activates the push button 44 by pushing the push button 44 whereby the rods 40 are released upwardly and outwardly from the open section 39 of the shaft 20 and into the crustacean body 110, whereby the crustacean body 110 is cracked open. The user then disengages the rods 40 by deactivating the push button 44 whereby the rods 40 withdraw into the internal cavity 32 of the shaft 20. The user may alternately utilize the shell-cracking body 80 to crack open a crustacean body 110 by placing a crustacean body 110 or a portion thereof within the opening 90 and placing the user's thumb 116 into the indentation 95 disposed between the thumb rest member 92 protrusions 94 and placing a user's finger 118 into each of the second indentations 99 between the protuberances 98 of the grip member 96. The user leverages the top portion 82 against the bottom portion 83 thus forcing the ridges 87 disposed along the inside edge 88 of the top portion 82 against the ridges 87 disposed along the inside edge 88 of the bottom portion 83, whereby the crustacean body 110 is cracked open. After the crustacean body 110 is opened, the user disengages the shell-cracking body 80 from the crustacean body 110.

What is claimed is:

1. A crustacean preparation utensil kit comprising:
    an elongated cylindrical shaft having a front end, a rear end, a center section disposed between the front end and the rear end, a top side, a bottom side and an internal cavity therein;
    a prong disposed on the front end;
    a sharp tip disposed on the prong, the tip facing upwardly and rearwardly;
    an open section on the top side proximal to the front end;
    a plurality of elongated cylindrical rods disposed along the shaft front end within the internal cavity in a position parallel to the shaft;
    an automatic rod release mechanism disposed within the internal cavity, the release mechanism in operational communication with the rods;
    a push button disposed on the top side of the shaft, the push button in operational communication with the rod release mechanism;
    wherein activation of the push button activates the rod release mechanism;
    wherein activation of the rod release mechanism releases the rods upwardly and outwardly through the open section.

2. The crustacean preparation utensil kit of claim 1 wherein the rod release mechanism further comprises:
    a cylindrical release body slidingly disposed along the shaft center section within the internal cavity, a top end of the release body attached to the push button proximal to a rear edge of the release body, the release body further having a front edge;
    a wall disposed within the internal cavity proximal to a front side of the shaft center section;
    an aperture centrally disposed through the wall;

an elongated cylindrical dowel having a rearward end fixedly attached to the front edge of the release body within the internal cavity and a forward end having a lower end, the forward end angled rearwardly toward the wall, the dowel having a smaller diameter than the release body;

wherein the dowel slidingly engages the aperture through the wall;

a cylindrical stem extending forwardly from the lower end of the dowel forward end, the stem having a smaller diameter than the dowel;

a spring surrounding the dowel, the spring disposed between the release body front edge and the wall;

a pivotal member disposed within the internal cavity, the pivotal member pivotally attached to the stem;

an interior end of the rods pivotally attached to the pivotal member;

wherein activation and alternate deactivation of the push button engages and alternately disengages the release body, respectively;

wherein the release body slidingly engages and alternately disengages the spring which, in turn, slidingly engages and alternately disengages dowel upon activation and alternate deactivation of the push button, respectively;

wherein the stem pivots the pivotal member upwardly from the open section upon engagement of the release body;

wherein the pivotal member releases the rods upwardly and outwardly from the internal cavity and through the open section upon the pivoting of the pivotal member;

wherein the rods move downwardly and inwardly into the internal cavity upon the release of the push button.

3. The crustacean preparation utensil kit of claim 2 further comprising:

a substantially cheliform shell-cracking body having a top portion, a bottom portion, a forward portion, and a rear side, the top portion and the bottom portion having an identical length;

a reinforced spring pivotally interconnecting the top portion and the bottom portion proximal to the shell-cracking body rear side, the reinforced spring further operationally interconnecting the top portion and the bottom portion;

a plurality of sharp pointed ridges formed into an inside edge of each of the top portion and the bottom portion proximal to the forward portion, the ridges disposed on the top portion in operational communication with the ridges disposed on the bottom portion;

an opening disposed between the ridges;

a contoured thumb rest member disposed on an upper edge of the top portion, the thumb rest member comprising a pair of rounded spaced apart protrusions and an indentation disposed therebetween; and a contoured grip member disposed on a lower edge of the bottom portion, the grip member comprising a plurality rounded spaced apart protuberances and a second indentation disposed therebetween.

4. The crustacean preparation utensil kit of claim 3 further comprising:

a cylindrical handle attached to the shaft rear end, the handle having a continuous outer wall;

a plurality of rounded contoured ridges disposed along a lower side of the outer wall.

5. A crustacean preparation utensil kit comprising:

an elongated cylindrical shaft having a front end, a rear end, a center section disposed between the front end and the rear end, a top side, a bottom side and an internal cavity therein;

a prong disposed on the front end, wherein the prong removably engages a crustacean body through a rearward end of an abdomen of the crustacean body;

a sharp tip disposed on the prong, the tip facing upwardly and rearwardly;

an open section on the top side proximal to the front end;

a plurality of elongated cylindrical rods disposed along the shaft front end within the internal cavity in a position parallel to the shaft;

an automatic rod release mechanism disposed within the internal cavity, the release mechanism in operational communication with the rods;

a push button disposed on the top side of the shaft, the push button in operational communication with the rod release mechanism;

a cylindrical release body slidingly disposed along the shaft center section within the internal cavity, a top end of the release body attached to the push button, the release body having a rear edge and a front edge;

a wall disposed within the internal cavity proximal to a front side of the shaft center section;

an aperture centrally disposed within the wall;

an elongated cylindrical dowel having a rearward end fixedly attached to the front edge of the release body within the internal cavity and a forward end having a lower end, the forward end angled rearwardly toward the wall, the dowel having a smaller diameter than the release body;

a cylindrical stem extending forwardly from the lower end of the dowel forward end, the stem having a smaller diameter than the dowel;

a spring surrounding the dowel, the spring disposed between the release body front edge and the wall;

a pivotal member disposed within the internal cavity, the pivotal member pivotally attached to the stem;

an interior end of the rods pivotally attached to the pivotal member;

wherein activation and alternate deactivation of the push button engages and alternately disengages the release body, respectively;

wherein the release body slidingly engages and alternately disengages the spring which, in turn, slidingly engages and alternately disengages the dowel upon activation and alternate deactivation of the push button, respectively;

wherein the stem pivots the pivotal member upwardly from the open section upon engagement of the release body;

wherein the pivotal member releases the rods upwardly and outwardly from the internal cavity and through the open section upon the pivoting of the pivotal member;

wherein the rods move downwardly and inwardly into the internal cavity upon the release of the push button;

a cylindrical handle attached to the shaft rear end, the handle having a continuous outer wall;

a plurality of rounded contoured ridges disposed along a lower side of the outer wall; and a groove disposed between the ridges;

wherein each groove is formed to accommodate a finger therein.

6. The crustacean preparation utensil kit of claim 5 a substantially cheliform shell-cracking body having a top portion, a bottom portion, a forward portion, and a rear side, the top portion and the bottom portion having an identical length;

a reinforced spring pivotally interconnecting the top portion and the bottom portion proximal to the shell-cracking body rear side, the reinforced spring further operationally interconnecting the top portion and the bottom portion;

a plurality of sharp pointed ridges formed into an inside edge of each of the top portion and the bottom portion proximal to the forward portion, the ridges disposed on the top portion in operational communication with the ridges disposed on the bottom portion;

an opening disposed between the ridges;

a contoured thumb rest member disposed on an upper edge of the top portion, the thumb rest member comprising a pair of rounded spaced apart protrusions and an indentation disposed therebetween;

wherein the indentation between the protrusions is formed to accommodate a user's thumb therein;

a contoured grip member disposed on a lower edge of the bottom portion, the grip member comprising a plurality of rounded spaced apart protuberances and a second indentation disposed therebetween;

wherein each second indentation between the protuberances is formed to accommodate a user's finger therein.

7. A method of utilizing the crustacean preparation utensil kit of claim 6, the method comprising:

placing a finger into the each of the groove disposed between the contoured ridges disposed in the handle outer wall;

inserting the prong disposed on the front end of the shaft into a rearward end of an abdomen of a crustacean body;

activating the push button by pushing the push button whereby the rods are released upwardly and outwardly from the open section of the shaft and into the crustacean body, whereby the crustacean body is cracked open;

disengaging the rods by deactivating the push button whereby the rods withdraw into the internal cavity of the shaft;

alternately utilizing the shell-cracking body, the method of using the shell-cracking body comprising:

placing a crustacean body within the opening placing a user's thumb into the indentation disposed between the thumb rest member protrusions and placing a user's finger into each of the second indentations between the protuberances of the grip member;

leveraging the top portion against the bottom portion;

forcing the ridges disposed along the inside edge of the top portion against the ridges disposed along the inside edge of the bottom portion, whereby the crustacean body is cracked open;

disengaging the shell-cracking body from the crustacean body.

* * * * *